United States Patent
Westerink et al.

(10) Patent No.: US 6,359,657 B1
(45) Date of Patent: *Mar. 19, 2002

(54) SIMULTANEOUSLY DISPLAYING A GRAPHIC IMAGE AND VIDEO IMAGE

(75) Inventors: Joanne H. D. M. Westerink; Magdalena D. Brouwer-Janse; Tedde Van Gelderen; Hok K. Tang; Remko Westrik, all of Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,031

(22) Filed: May 2, 1997

(30) Foreign Application Priority Data

May 6, 1996 (EP) .............................. 96201240

(51) Int. Cl.$^7$ ................................. H04N 9/74
(52) U.S. Cl. ...................... 348/584; 348/589; 348/566; 348/570; 348/578
(58) Field of Search ............................... 348/586, 587, 348/591, 592, 594, 595, 593, 584, 589, 566, 570, 578; 345/113, 114, 121

(56) References Cited

U.S. PATENT DOCUMENTS

| 4,602,286 A | * | 7/1986 | Kellar et al. | 358/183 |
|---|---|---|---|---|
| 4,827,253 A | * | 5/1989 | Maltz | 348/587 |
| 4,855,831 A | * | 8/1989 | Miyamoto et al. | 345/113 |
| 4,980,766 A | * | 12/1990 | Vladkov | 358/183 |
| 5,017,143 A | * | 5/1991 | Backus et al. | 348/586 |
| 5,031,043 A | * | 7/1991 | Rocco et al. | 358/181 |
| 5,214,512 A | * | 5/1993 | Freeman | 348/595 |
| 5,283,560 A | * | 2/1994 | Bartlett | 345/113 |
| 5,355,173 A | * | 10/1994 | Fujita | 348/593 |
| 5,416,529 A | * | 5/1995 | Lake | 348/590 |
| 5,428,401 A | * | 6/1995 | Hinson | 348/586 |
| 5,502,504 A | * | 3/1996 | Marshall et al. | 348/565 |
| 5,621,428 A | * | 4/1997 | King et al. | 348/118 |
| 5,754,165 A | * | 5/1998 | Oyashiki et al. | 345/154 |
| 5,825,433 A | * | 10/1998 | Yamada et al. | 348/584 |
| 6,023,302 A | * | 2/2000 | MacInnis et al. | 348/597 |

FOREIGN PATENT DOCUMENTS

GB      2078049 A      12/1981

* cited by examiner

Primary Examiner—Michael Lee
Assistant Examiner—Linus H. Lo
(74) Attorney, Agent, or Firm—Laurie E. Gathman

(57) ABSTRACT

A method and arrangement for simultaneously displaying a graphic image (23) (e.g., a control menu of a television receiver or video recorder) and a video image (22). In order to achieve optimal legibility of the menu without fully obscuring the underlying video signal, the graphic image is accommodated within a window (21) and the window is given an adequate color (24) which is additively mixed with the video signal. The mixing factor is preferably controlled in response to the amount of spatial and/or temporal activity of the video signal within the window.

7 Claims, 3 Drawing Sheets

SIMULTANEOUSLY DISPLAYING A GRAPHIC IMAGE AND VIDEO IMAGE

BACKGROUND OF THE INVENTION

1. Field of the Invention

The invention relates to a method and arrangement for simultaneously displaying a graphic image and a video image, the graphic image being accommodated within a window. The invention also relates to a television receiver, a video recorder and a multimedia station comprising such an arrangement.

2. Description of the Related Art

A prior-art method of displaying a graphic image within a window of a video image is disclosed in UK Patent Application GB-A-2 242 594. To improve the visibility of the graphic image, the contrast of the video image is reduced within the window.

SUMMARY OF THE INVENTION

It is an object of the invention to further improve the prior-art arrangement.

In accordance with the invention, the method is characterized by generating a background color signal for said window and mixing said background colour signal and the video signal representing said video image. It is thereby achieved that the window can be given a color contrasting with the graphic image colour while maintaining the display of the video image within the window. The visibility of the graphic image is further improved by giving the window a background color. More particularly, the legibility of text constituting a menu-on-screen is considerably improved. moreover, the appearance of menus-on-screen is considerably enhanced. The window resembles a colored, partly transparent, piece of glass between the graphic image and the video image.

As described in the patent application mentioned above, the step of generating a background color signal is known per se. However, the video image is then not displayed within the window. The graphic image may have a perfect visibility, but a part of the video image is lost and cannot be observed. It is further known from international patent application WO 94/21080 to additively mix a graphic image with a video signal. However, it is not desirable that the video signal remains visible through the graphic image itself, e.g., through the characters of a menu.

To prevent the mixed signal within the window from assuming a too large amplitude, the video signal and the background color signal may be given weighting factors, for example, $\alpha$ and $1-\alpha$, respectively. The larger the value of $\alpha$, the better the underlying video signal remains visible. The weighting factor $\alpha$ will therefore also be referred to as "transparency" of the window.

Experiments have shown that the legibility of on-screen-menus is substantially affected by the amount of activity in the video image. More particularly, video images having fine picture details with a high contrast (e.g., text) substantially interfere with graphic menus. Said interference occurs, in particular, when the video image is static. In a preferred embodiment of the invention, the weighting factors are therefore controlled in response to the amount of activity in the video image within the window. The amount of activity in the graphic image may be taken into account as well so as to determine when interference between video and graphic image details is most annoying.

It has also turned out that menus in television receivers have a different legibility for different categories (drama, documentaries, sports) of television programs. In a further embodiment of the invention, the weighting factors are therefore controlled in response to said categories.

These and other aspects of the invention will be apparent from and elucidated with reference to the embodiments described hereinafter.

DESCRIPTION OF THE PREFERRED EMBODIMENTS

Figure 1:
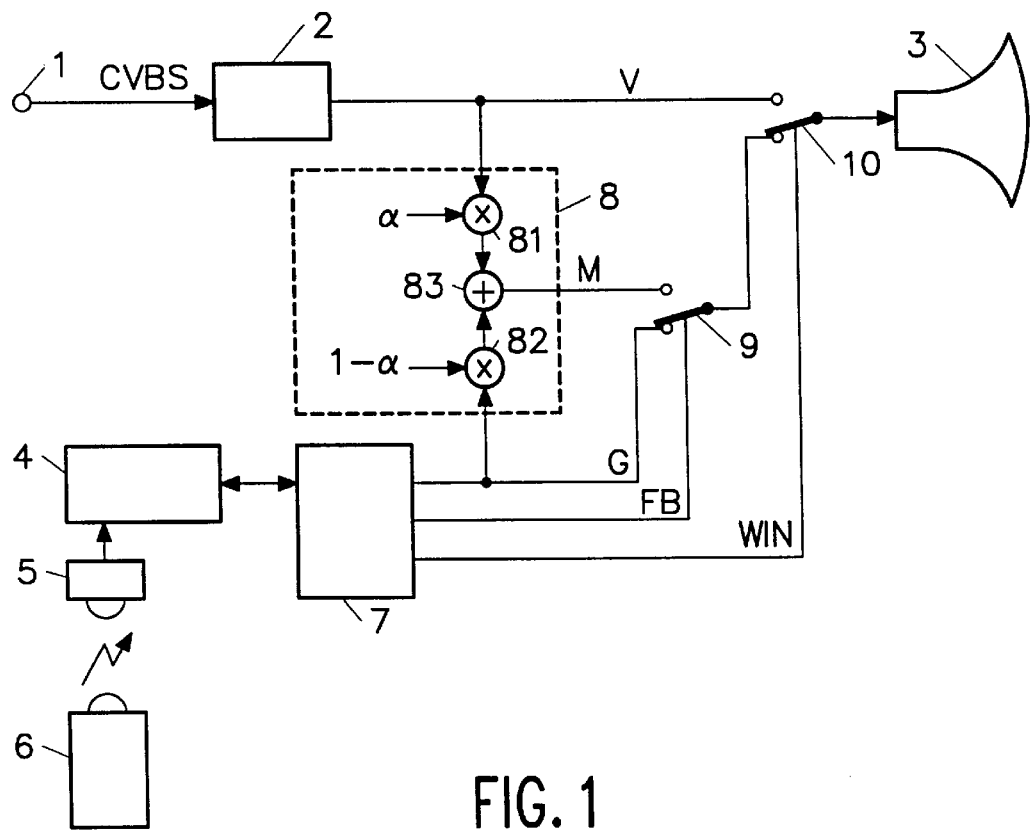
FIG. 1 shows a television receiver comprising an arrangement for simultaneously displaying a graphic image and a video image in accordance with the invention.

FIG. 1 shows a television receiver comprising an arrangement for simultaneously displaying a graphic image and a video image in accordance with the invention. The receiver comprises, in further known manner, an input 1 for receiving a composite video signal CVBS, a video processing circuit 2 receiving the composite video signal for generating a displayable output signal V, a display screen 3, a microprocessor 4 for controlling the operation of the receiver, a remote control receiver 5, and a remote control transmitter 6.

The receiver further comprises a graphic signal generator 7 which is controlled by the microprocessor and adapted to generate a graphic image representing, for example, an on-screen control menu. The graphic signal generator 7 generates a graphic signal G, a fast blanking signal FB, and a window signal WIN. An example of such a graphic signal generator is Philips integrated circuit SAA5240. When the fast blanking signal FB is active, the graphic signal defines a graphic image to be displayed on a screen (not shown) in terms of one or more foreground colors. When the fast blanking signal is inactive, the graphic signal has been programmed to have a background color. The window signal WIN defines a window within which the graphic image is to be displayed. Obviously, the window may have any shape.

The receiver further comprises mixing means 8 for mixing the graphic signal G and the video signal V. In the embodiment shown, a first multiplier 81, a second multiplier 82, and an adder 83 form an additively mixed signal $M=\alpha V+(1-\alpha)G$. Generally, the graphic signal G and video signal V consist of three (red, green, blue) components. The mixing means 8 are then provided for each component. Switches 9 and 10 are provided for selecting either the graphics signal G, the video signal V or the additively mixed signal M. More particularly, switch 9 is in the position shown when the fast blanking signal FB is active, and switch 10 is in the position shown when the window signal WIN is active. Thus, the video signal V is selected for display when the window signal is inactive, the graphic signal G is selected when the fast blanking signal and the window signal are both active, and the mixed signal M is selected when the window signal is active and the fast blanking signal is inactive.

Figure 2:
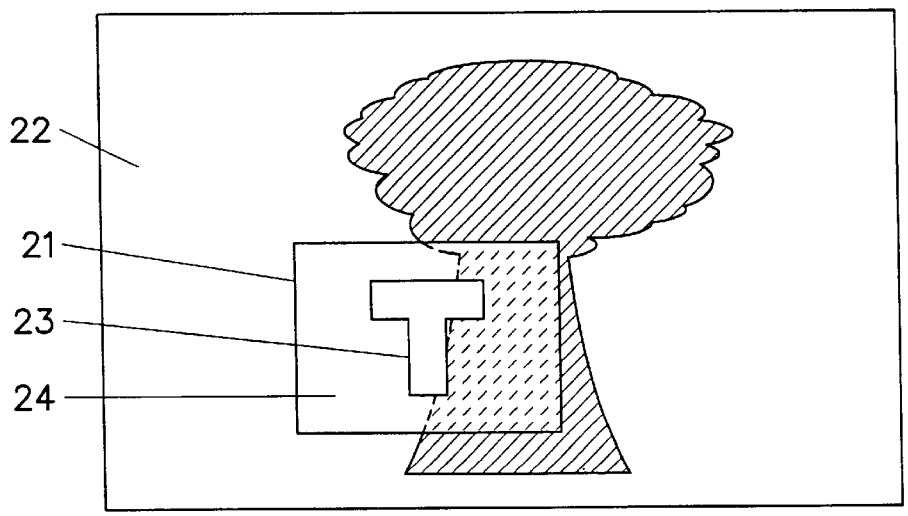
FIG. 2 shows an example of a screen display.

FIG. 2 shows an example of a screen display. Outside the window 21, a video image 22 is displayed. Within the window, a graphic image 23 is displayed, using one or more foreground colors. As explained above, the graphic signal has a background color when the fast blanking signal is inactive. Thus, the part 24 of the window which is not occupied by the graphic image 23 displays a mixture of said background color and the video image. If the background color is green, for example, it is as if a green glass is held between the graphic image and the video image. By programming a background color having a sufficient contrast with the foreground colors, the menu has an excellent legibility, while the video signal remains visible through the window. The transparency of the glass is determined by the weighting factor α. The value thereof can be determined experimentally.

It should be noted that the television receiver shown in FIG. 1 need not necessarily include the display screen 3. The display screen may be external to the receiver, which is the case if the receiver constitutes, for example, a video recorder or a personal computer. In the latter case, the video signal V may even be a locally generated virtual video signal.

Figure 3:
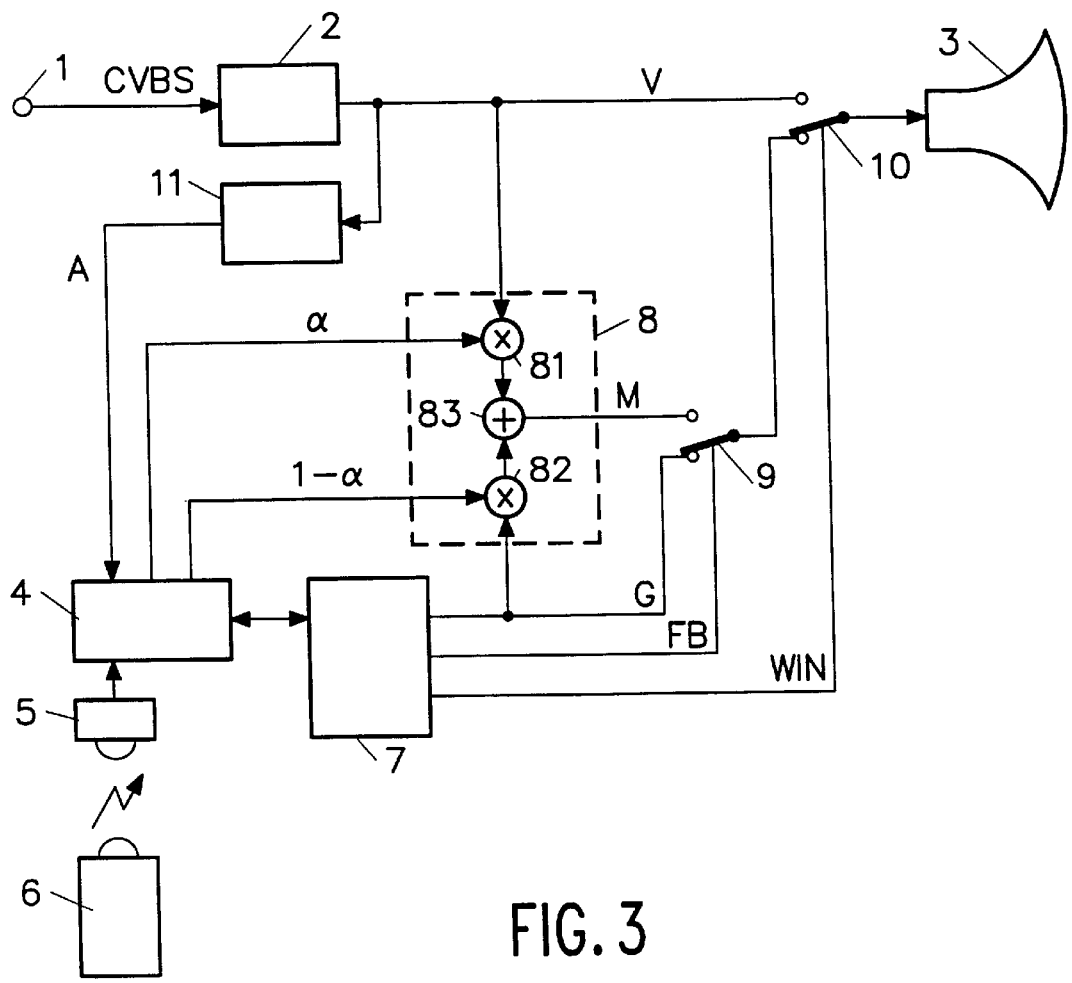
FIG. 3 shows a further embodiment of the receiver in accordance with the invention.
Figure 4:
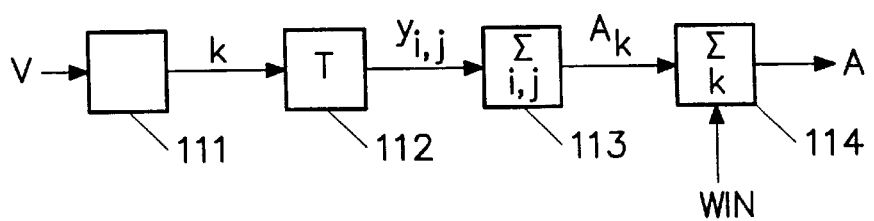
FIG. 4 shows an embodiment of an activity measuring circuit which is shown in FIG. 4.

FIG. 3 shows a further embodiment of the receiver. This receiver further comprises a circuit 11 for measuring an amount of image activity in the video image. A signal $A_k$, indicative of local video image activity, is applied to the microprocessor 4 which, in response thereto, controls the value of weighting factors α and 1-α. The amount of spatial activity in a video image can be determined by subjecting the image, or at least the luminance component thereof, to a picture transform. FIG. 4 shows an embodiment of the activity measuring circuit 11. A block-forming circuit 111 divides the image into blocks of, for example, 8*8 pixels. The blocks are subjected to a picture transform such as the Discrete Cosine Transform or the less complicated Hadamard transform, in picture transformer 112. Picture transform is well-known in the field of image coding. Each block of pixels is transformed into transform coefficients $y_{ij}$ in which index i (here i=0 ... 7) denotes a horizontal spatial frequency and index j (j=0 ... 7) denotes a vertical spatial frequency. Each transform coefficient indicates to what extent the corresponding spatial frequencies are present in the block of pixels. The coefficients $y_{ij}$ are applied to an evaluation circuit 113 which calculates the sum, possibly a weighted sum, of coefficients for those spatial frequencies that interfere most annoyingly with the graphic image. For example, if the spatial frequencies corresponding to $i \geq 5$ and $j \geq 5$ are interfering frequencies, the evaluation circuit calculates a local activity $A_k$ of the current block k in accordance with the expression:

$$A_k = \sum_{i=5}^{7} \sum_{j=5}^{7} y_{ij}$$

In an averaging circuit 114, the average activity A of all blocks within the window (21 in FIG. 2) is calculated in accordance with the expression:

$$A = \frac{1}{N} \sum_k A_k$$

wherein N is the number of blocks within the window. In order to determine this number, the averaging circuit 114 receives the window signal WIN from graphic signal generator 6.

Figure 5:
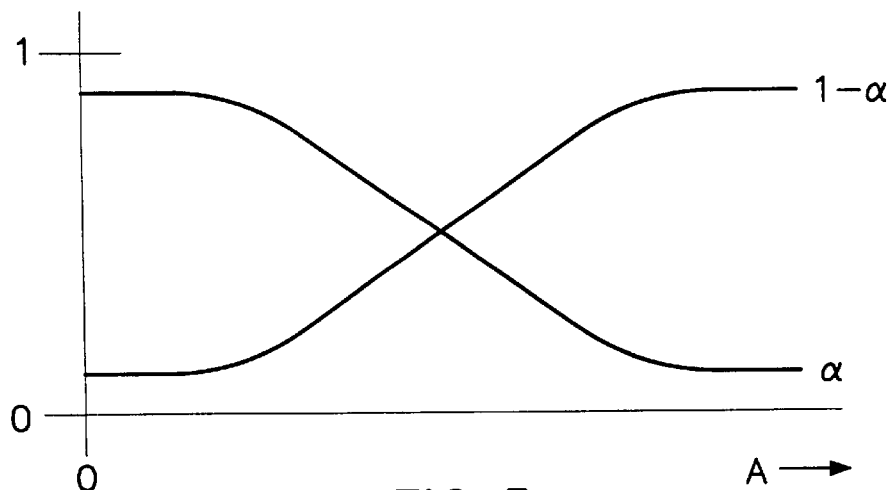
FIG. 5 shows an example of a relation between the amount of mixing and video image activity.

The activity value A is applied to microprocessor 4 which, in response thereto, generates the weighting factors α and 1-α applied to the mixing means 8. An example of the relation between the weighting factors and activity is shown in FIG. 5. Weighting factor α decreases (and 1-α increases accordingly) as activity A increases. Thus, if the video image within the window comprises a significant amount of detail, the "glass transparency" is reduced so as to render the graphic image within the window better visible.

Further embodiments of the activity measuring circuit can easily be designed by those skilled in the art. For example, the transform coefficients $y_{ij}$ (circuit 113 in FIG. 4) may also be evaluated by microprocessor 4. As the microprocessor has generated the graphic image and thus knows the spatial frequencies of said graphic image, the microprocessor can be arranged to evaluate only the coefficients that actually interfere with the graphic image. The microprocessor may also control the glass transparency on a block-by-block basis.

Figure 6:
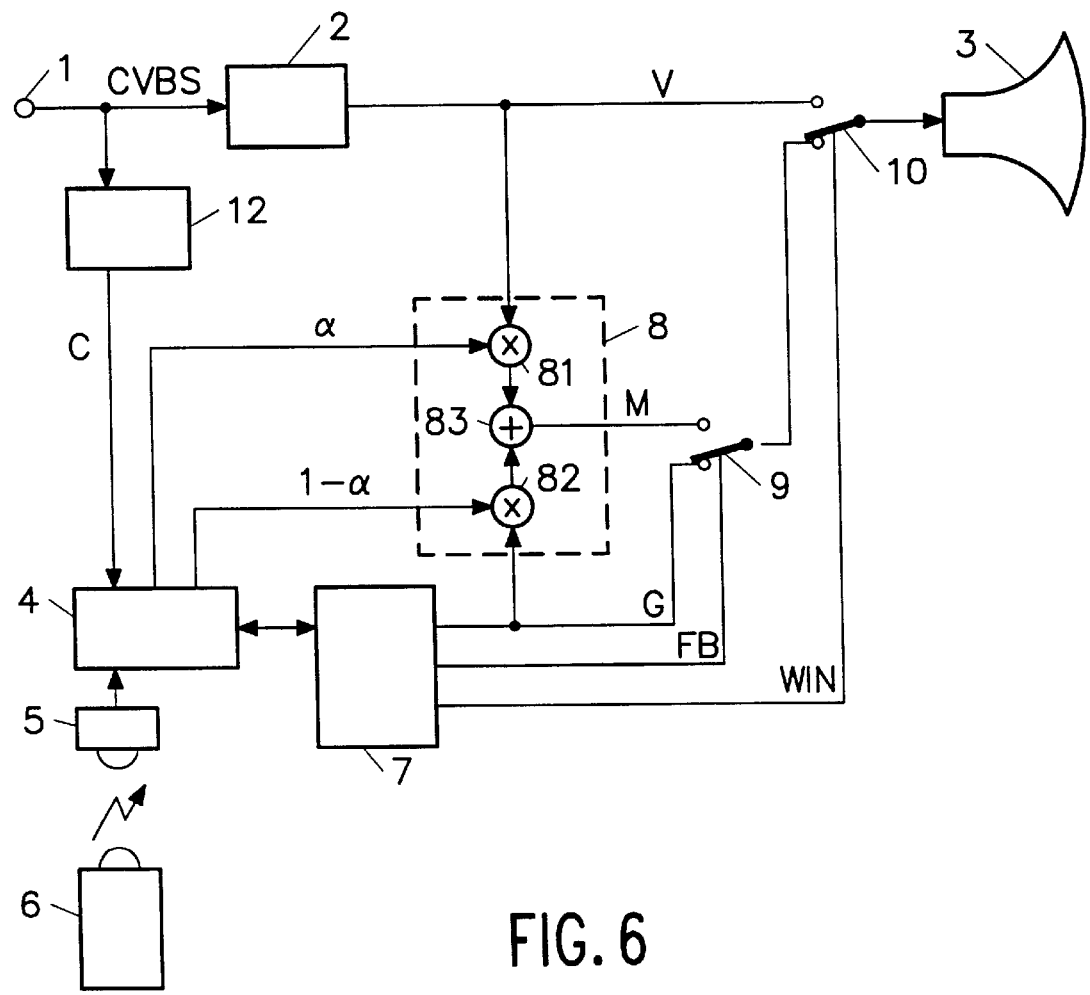
FIG. 6 shows a further embodiment of the receiver in accordance with the invention.

FIG. 6 shows a further embodiment of the receiver. The receiver now comprises a circuit 12 for receiving and decoding a program category code C. The transmission of program category codes, which classify a television program in one of a plurality of categories such as drama, sports, documentaries, etc., is known in the art. For example, the category code may be part of the PDC (Program Delivery Control) data which is embedded in a teletext signal in the vertical blanking interval of the composite video signal CVBS. The code C is applied to the microprocessor 4 which comprises a table defining the weighting factor α for each category. Quiet television programs, such as text-oriented educational courses, are given a smaller value of α (i.e., less transparency) than highly dynamic programs such as sports events and action movies which affect the legibility of a menu to a lesser degree.

It should be noted that the processor may also be adapted to cause the graphic signal generator to modify the background color in accordance with image activity or program category.

In summary, a method and arrangement for simultaneously displaying a graphic image (e.g., a control menu of a television receiver or video recorder) and a video image is disclosed. In order to achieve optimal legibility of the menu without fully obscuring the underlying video signal, the graphic image is accommodated within a window and the window is given an adequate colour which is additively mixed with the video signal. The mixing factor is preferably controlled in response to the amount of spatial and/or temporal activity of the video signal within the window.

What is claimed is:

1. A method of simultaneously displaying a graphic image and a video image, comprising the steps of;

generating a background color for said graphic image;

generating a control signal having a first value to indicate said graphic image and a second value to indicate said background color;

generating a window covering a portion of said video image and including said graphic image;

selecting the graphic image for display within the window in response to the first value of the control signal;

mixing said background color and the video image, within the window in response to second value of the control signal so as to color the video image by said background color; and wherein the video image is displayed outside the window; and wherein the background color signal and the video signal are given respective weighting factors which are automatically controlled in response to the amount of activity in the video image within said window.

2. A method as claimed in claim 1, wherein the weighting factors are further adaptively controlled automatically in response to an amount of activity in the graphic image.

3. An arrangement for displaying a graphic image and a video image simultaneously, said arrangement comprising:

means for generating a background color for said graphic image;

means for generating a control signal having a first value to indicate said graphic image and a second value to indicate said background color;

means for generating a window covering a portion of said video image and including said graphic image;

means for selecting the graphic image for display within the window in response to the first value of the control signal; and means for mixing said background color and the video image within the window in response to the second value of the control signal so as to color the video image by said background color;

wherein the video image is displayed outside the window; and wherein the background color signal and the video signal are given respective weighting factors which are automatically controlled in response to the amount of activity in the video image within said window.

4. An arrangement as claimed in claim 3, further comprises means for adaptively controlling the weighting factors controls the weighting factors automatically in response to an amount of activity in the graphic image.

5. A television receiver including means for receiving television signals and for displaying a video image representing said television signals, said television receiver including an arrangement for displaying a graphic image and said video image, said arrangement comprising a graphic generator for generating said graphic image accommodated within a window, wherein said arrangement further comprises:

means for generating a background color signal for said window; and means for mixing said background color signal and the video signal representing said video image wherein the mixing is automatically controlled in response to the amount of activity of the video image within the window.

6. A video recorder including means for generating a video image and an arrangement for displaying a graphic image and said video image, said arrangement comprising a graphic generator for generating said graphic image accommodated within a window, wherein said arrangement further comprises:

means for generating a background color signal for said window; and means for mixing said background color signal and the video signal representing said video image wherein the mixing is automatically controlled in response to the amount of activity of the video image within the window.

7. A multimedia station comprising a personal computer having means for generating a video image, said multimedia station including an arrangement for displaying a graphic image and said video image, said arrangement comprising a graphic generator for generating said graphic image accommodated within a window, wherein said arrangement further comprises:

means for generating a background color signal for said window; and means for mixing said background color signal and the video signal representing said video image wherein the mixing is automatically controlled in response to the amount of activity of the video image within the window.

* * * * *